United States Patent
Tao et al.

(10) Patent No.: US 7,953,328 B2
(45) Date of Patent: May 31, 2011

(54) OPTICAL DQPSK TRANSMITTER PHASE MONITOR AND CONTROL

(75) Inventors: Zhenning Tao, Beijing (CN); Jens C. Rasmussen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1100 days.

(21) Appl. No.: 11/723,938

(22) Filed: Mar. 22, 2007

(65) Prior Publication Data
US 2007/0230617 A1   Oct. 4, 2007

(30) Foreign Application Priority Data

Mar. 22, 2006   (CN) .......................... 2006 1 0065454

(51) Int. Cl.
*H04B 10/06* (2006.01)
(52) U.S. Cl. ......... 398/198; 332/109; 342/103; 375/298
(58) Field of Classification Search .................. 329/304; 332/103; 342/194; 375/298, 235, 261; 398/186, 398/189–191, 195, 198
See application file for complete search history.

(56) References Cited

U.S. PATENT DOCUMENTS
2005/0117191 A1   6/2005   Griffin

OTHER PUBLICATIONS

Chinese Office Action issued on Sep. 18, 2009 in corresponding Chinese Patent Application 200610065454.2.

*Primary Examiner* — Leslie Pascal
(74) *Attorney, Agent, or Firm* — Staas & Halsey LLP

(57) ABSTRACT

An apparatus and a method for a I-Q quadrature modulation transmitter monitor a phase bias between an I branch and a Q branch of the I-Q quadrature modulation transmitter. The I-Q quadrature modulation transmitter includes the I-branch, the Q-branch equipped with a phase bias, and a tap. The apparatus is installed between the tap and the phase bias, and monitors the phase between the I branch and the Q branch which phase is introduced by the phase bias. The apparatus includes the following components: a module squarer, receiving signal from the tap and outputting a module square of the received signal; a multiplier, to multiplying data of the I-branch, data of the Q-branch and the module square to output a multiplied signal; and an averager, averaging the multiplied signal output by the multiplier. The phase between the I branch and the Q branch may be corrected according to monitoring results.

25 Claims, 8 Drawing Sheets

OPTICAL DQPSK TRANSMITTER PHASE MONITOR AND CONTROL

CROSS-REFERENCE TO RELATED APPLICATIONS

This application is related to and claims priority from Chinese Application No. 200610065454.2 filed Mar. 22, 2006 in the State Intellectual Property Office of the People's Republic of China, the contents of which are incorporated by reference herein.

BACKGROUND OF THE INVENTION

1. Field of the Invention

The present invention relates to an apparatus and a method for monitoring an I-Q phase bias in an I-Q quadrature modulation transmitter. The method is suitable for a variety of communication systems, optical communication systems or other communication systems, that use in-phase branching and quadrature-phase branching, such as a Differential Quadrature Phase-Shift Key (D QPSK), a Quadrature Phase-Shift Key (QPSK), a Multi Phase-Shift Key (M-PSK), and a Differential Multi Phase-Shift Key (DM-PSK) Quadrature Amplitude Modulation (QAM).

2. Description of the Related Art

The data transfer capacity of optical communication has increased dramatically in the past several years. The traditional binary amplitude shift keying (also known as on-off key, OOK) of non-zero-return (NRZ) or zero-return (RZ) still dominates as the practical modulation technology. Recently, many new modulation and demodulation technologies, such as duobinary, Carrier Suppressed Return-to-Zero (CSRZ), and differential phase-shift keying (DPSK), have been introduced in optical communications. In the DPSK modulation, information is represented by a phase change of two neighboring symbols. In the binary DPSK, phase change is 0 or $\pi$. If phase changes are 0, $\pi/2$, $\pi$ or $3\pi/2$, the modulation technology is called Differential Quadrature Phase-Shift Keying (DQPSK). Compared with traditional OOK technology, phase-shift keying has advantages in terms of an optical signal-to-noise ratio (OSNR) gain of 3 dB, and a strong anti-non-linearity capability. By using the quaternary symbols, optical DQPSK doubles the utilization of the frequency spectrum, while the requirements for the electric device speed, the optical dispersion management, and the polarization mode dispersion are lowered. It is expected that optical DQPSK will play an important role in the next generation of optical communications.

According to the article *Optical Differential Quadrature Phase-Shift Key (oDQPSK) for High Capacity Optical Transmission* (R. A. Griffin et al., OFC 2002), the contents of which are hereby incorporated by reference, a typical optical DQPSK transmitter consists of: a splitter to divide an input optical signal into an I branch signal and a Q branch signal; an I-branch modulator (1 or −1) and a Q-branch modulator (1 or −1), with a phase bias on the Q-branch; and a combiner to combine the I-branch signal and the Q-branch signal into a modulated signal. In order to ensure the quadrature of the I-branch and the Q-branch, the phase bias should be $\pi/2$. A phase bias different from $\pi/2$ would cause an additional optical signal to noise ratio (OSNR) penalty. A feedback control is usually adopted, in which a monitoring device monitors a phase error of the phase bias and generates a phase error signal to adjust the phase bias, so as to lock the phase bias to the $\pi/2$ value. An often-used feedback control technology is the dither-peak detection. A typical configuration of a dither-peak detection scheme is displayed in FIG. 1. A phase bias generator 108 dithers at a fixed frequency f, while a monitoring device 002 outputs a corresponding phase error monitoring signal. When the phase is at the target value of dither (as illustrated in 005), the error signal reaches a maximum or a minimum value. The control logic device 004 adjusts the DC bias 003 according to whether the monitoring signal has reached a peak value (the maximum or the minimum value), so that the phase bias 108 is set to an optimal point. The traditional dither-peak detection scheme (as exemplary illustrated in FIG. 1) has the following intrinsic defects:

1. The phase dithering will lead to an additional optical signal to noise ratio (OSNR) penalty.
2. The peak detection method can only determine whether the phase is at a target value. It cannot indicate whether the current phase is greater or smaller than the target value.
3. The monitoring signal obtained via the peak detection is in a square relation to the phase error, therefore the peak detection signal becomes far less sensitive when approaching a zero error point, which leads to a low phase control precision.
4. The speed of the phase control is constrained by the dithering frequency.

A new phase control method is needed to overcome the above-mentioned defects.

SUMMARY OF THE INVENTION

An aspect of the present invention is to overcome the above-mentioned defects by a dithering-free phase monitoring apparatus and a method, in which both the magnitude and the sign of phase error are detected.

According to an aspect of the present invention, an I-Q phase bias monitoring apparatus is provided for an I-Q quadrature modulation transmitter. The I-Q quadrature modulation transmitter includes an I-branch, a Q-branch equipped with a phase bias, and a tap. The I-Q phase bias monitoring apparatus is installed between the tap and the phase bias, and is used to monitor a phase error of the phase bias. The I-Q phase bias monitoring apparatus includes the following components: a module squarer receiving a signal from the tap and outputting a module square of the signal; a multiplier, generating an output signal by multiplying data of I-branch, data of Q-branch and the module square output by the module squarer; and an averager, averaging the output signal of the multiplier.

According to another aspect of the present invention, an I-Q phase bias monitoring method is used in an I-Q quadrature modulation transmitter. The I-Q quadrature modulation transmitter includes an I-branch, a Q-branch equipped with a phase bias, and a tap. The I-Q phase bias monitoring method monitors a phase error of the phase bias. The I-Q phase bias monitoring method includes the following operations: calculating a module square of a signal received from the tap; generating an output signal by multiplying data of the I-branch, data of the Q-branch, and the calculated module square; and averaging the output signal.

According to another aspect of the present invention, an I-Q quadrature modulation transmitter, which includes an I-branch, a Q-branch equipped with a phase bias, and a tap, has an I-Q phase bias monitoring apparatus installed between the tap and the phase bias, for monitoring a phase error of the phase bias. The I-Q phase bias monitoring apparatus includes the following components: a module squarer, receiving a signal from the tap and outputting a module square of the received signal; a multiplier, generating an output signal by multiplying data of the I-branch, data of the Q-branch, and the module square output by the module squarer; and an averager, averaging the output signal generated by the multiplier.

Another aspect inventive concept provides a device and a method to control the phase bias according to a phase monitoring result.

Various aspects of the present invention may have one or more of the following advantages:

1) Usage of the phase dithering is avoided, and, thus, no additional OSNR penalty occurs;

2) Both the magnitude of the phase error and the sign (i.e., direction) of the phase error are detected;

3) The precision of the phase error control is improved. The phase error signal output by the phase monitor is proportional to the phase error (i.e. the derivative of the error signal of the phase error is fixed). This feature guarantees that the sensitivity of the phase error signal remains fixed when phase error approaches zero; and 4) The speed of the phase control is no longer restricted by the dithering speed, thus quick phase locking can be achieved.

It must be noted here that the above-enumerated advantages are achieved by different embodiments, but a specific embodiment does not necessarily enjoy all advantages mentioned above. Some embodiments may even fail to provide any of the above-enumerated advantages, while featuring other advantages or merits.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
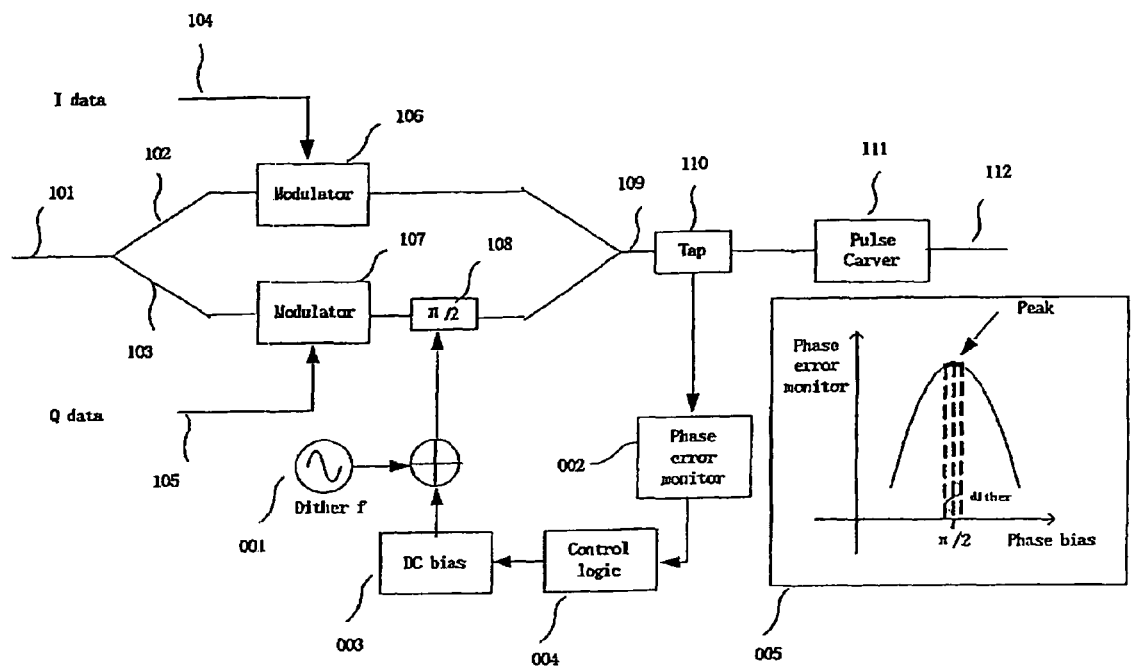
FIG. 1 is a diagram of a structure of an DQPSK transmitter with a traditional "dither-peak detection" scheme.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
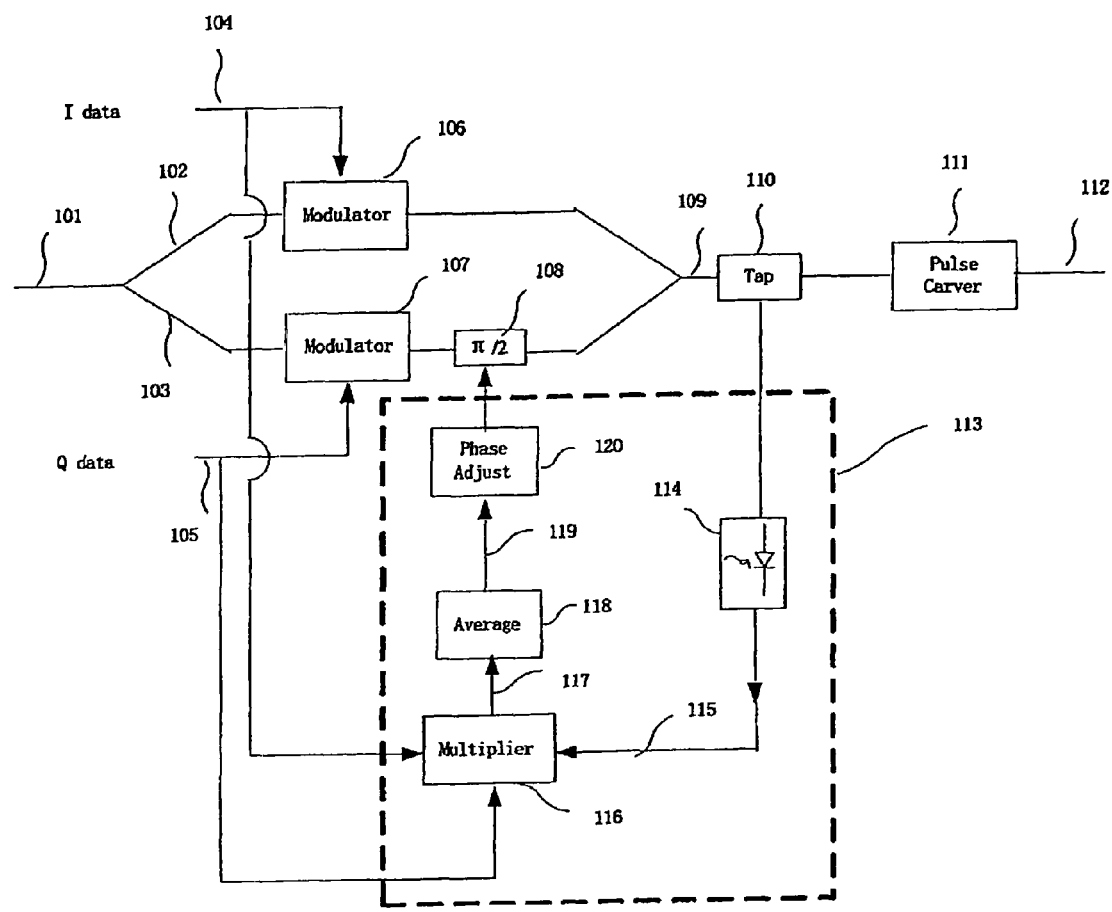
FIG. 2 is a diagram of a detailed structure of an I-Q phase bias monitoring apparatus according to an embodiment of the present invention and a structure of a corresponding DQPSK transmitter.

FIG. 2 is a diagram of a detailed structure of DQPSK transmitter with a I-Q phase bias monitoring apparatus according to an embodiment of the present invention. In FIG. 2, an unmodulated input signal 101 is divided into an I-branch 102 and a Q-branch 103, and each of the I-branch 102 and the Q-branch 103 is equipped with a modulator, 106 and 107, respectively. The modulator 106 and 107 conducts 0 or π phase modulation on the respective signal on the I or the Q branch, which signals carry data 104 and 105, respectively. A phase bias device 108 introduces a phase bias of π/2 on the Q-branch. The phase bias introduced by the phase bias device 108 must be π/2, otherwise an additional optical signal to noise ratio (OSNR) penalty will occur. The modulated I and Q branch signals are combined into DQPSK signal 109 before entering a tap 110. Some transmitters are also equipped with a pulse carver 111 to adjust the shape of the pulse. In order to ensure that the phase bias is maintained at π/2, the transmitter includes a phase monitor 113, which has phase monitoring units (also called I-Q phase bias monitors, each including a module squarer 114, a multiplier 116, and an averager 118), and a phase adjuster 120. The tap 110 splits the main signal 109 and sends a part of the main signal 109 to the phase monitor 113. The tap 110 can be one of the commercially available products (such as an 1:10 optical splitter of JDS Uniphase). The modulators 106 and 107, the phase bias device 108, the tap 110 and the pulse carver 111 may be commercially available parts.

According to a modulation theory of DQPSK, the modulated signal 109 is:

$$D_I + D_Q \exp(j\theta)$$

where $D_I$ and $D_Q$ represent the I-branch data 104 and the Q-branch data 105, respectively, and their values are 1 and −1 (representing logic "1" and logic "0" respectively) or −1 and 1. The symbol θ represents a phase shift introduced by the phase bias device 108, and the ideal value of the phase shift is π/2. Suppose a phase error δ is induced by the phase bias device 108, i.e. θ=π/2+δ, then the signal 109 is:

$$D_I + jD_Q \exp(j\delta)$$

The module squarer 114 receives a part of the main signal 109 from the tap 110, obtains and outputs a module square of the received signal (i.e. an instantaneous power). The module squarer 114 may be a photo-electric detector and a photo diode in an optical communication system, an envelop detector in an electric communication system, a squarer made of a splitter and a multiplier in an analog circuit, and a module and square calculation of a Digital Signal Processing (DSP) unit. For example, the module squarer 114 can be a commercially available photo-electric detector, such as the photo-electric detector produced by Discovery Semiconductor.

The module squarer 114 generates an output signal 115 which is proportional with to module square of the optical signal 109, as follows:

$$|D_I + jD_Q \exp(j\delta)|^2 =$$
$$= |D_I|^2 + |D_Q|^2 + 2D_I D_Q \cos(\pi/2 + \delta) =$$
$$= 2 - 2D_I D_Q \sin(\delta)$$

The multiplier 116 is used to multiply the I-branch data 104, the Q-branch data 105, and the output signal 115 of the module squarer 114. Embodiments of the multiplier 116 will be discussed below. Thus, an output signal 117 of the multiplier 116 is:

$$(2 - 2D_I D_Q \sin(\delta))D_I D_Q =$$
$$-2D_I D_Q \sin(\delta)D_I D_Q - 2D_I D_Q =$$
$$-2\sin(\delta) + 2D_I D_Q$$

The averager 118 obtains an average value of an input signal. As $D_I$ and $D_Q$ are uniformly distributed between +1 and −1, and they are mutually independent, so the output signal 119 (the phase monitoring signal) is: $-2\sin(\delta)$.

The averager 118 may include a low pass filter eliminating high frequency components of an input signal while retaining low frequency components carrying the average value information, so as to perform the averager function. Alternatively, the averager may use a DSP module for an average value calculation.

As $-\sin(\delta) \approx -\delta$, when $\delta \ll 1$, when the phase error $\delta$ is very small, the output signal 119 of the averager 118 is approximately $-2\delta$.

Thus the output signal 119 of the phase monitor 113 is proportional to the phase error $\delta$. The output signal 119 of the averager 118, $-2\delta$, provides information on both the magnitude and the sign (i.e., direction) of the phase error $\delta$. As the phase monitor according to embodiments of the present inventive concept does not use the phase dithering, defects due to the phase dither are avoided. Additionally, the multiplication factor of the phase error signal is a constant. This means that the sensitivity of the phase monitoring does not decrease as the phase error decreases.

The remarks above are directed to a DQPSK transmitter, but this invention is applicable to any other I-Q quadrature modulation transmitter. According to *Principle of Modern Communications*(Cao Zhigang and Qian Yasheng, Tsinghua University Press, 1992.8, the contents of which are hereby incorporated by reference,), a block diagram of a typical I-Q quadrature modulation transmitter is similar to FIG. 1. $D_I$ and $D_Q$, representing the I-branch data and the Q-branch data, are mutually independent, and may not be restricted to the 1 and −1 values. They can be any value, averaging 0. An I-Q quadrature modulation system according to an embodiment of the present inventive concept has the following features: an unmodulated signal is divided into an I-branch signal and a Q-branch signal; $D_I$ and $D_Q$ are modulated separately; a phase bias of $\pi/2$ is applied to the Q-branch signal; modulated data signals from the I-branch and the Q-branch are combined; $D_I$ and $D_Q$ are mutually independent, with a zero average value. The present inventive concept is applicable to general I-Q quadrature modulation systems. In such an I-Q quadrature modulation system as exemplary illustrated in FIG. 2, the signal 115 output by the module squarer 114 is:

$$|D_I + jD_Q \exp(j\delta)|^2 = |D_I|^2 + |D_Q|^2 + 2D_I D_Q \cos(\pi/2 + \delta).$$

The signal 117 output by the multiplier 116 is:

$$|D_I + jD_Q \exp(j\delta)|^2 D_I D_Q =$$
$$= |D_I|^2 D_I D_Q + |D_Q|^2 D_I D_Q - 2|D_I D_Q|^2 \sin(\delta)$$

The output signal 119 of the averager 118 is:

$$E\{|D_I|^2 D_I D_Q + |D_Q|^2 D_I D_Q - 2|D_I D_Q|^2 \sin(\delta)\} =$$
$$= E\{|D_I|^2 D_I D_Q\} + E\{|D_Q|^2 D_I D_Q\} - 2\sin(\delta)E\{|D_I D_Q|^2\}$$

Since the signals $D_I$ and $D_Q$ are mutually independent, the above expression of the output signal 119 is further equal to $$= E\{D_I|^2 D_I\}E\{D_Q\} + E\{D_Q\}E\{D_I\} - 2\sin(\delta)E\{D_I D_Q|^2\}$$

Since $D_I$ and $D_Q$ have a zero average value, so $$E\{|D_I|^2 D_I\}E\{D_Q\} + E\{|D_Q|^2 D_Q\}E\{D_I\} - 2\sin(\delta)E\{|D_I D_Q|^2\} =$$
$$= 0 + 0 - 2\sin(\delta)E\{|D_I D_Q|^2\} = -2k\sin(\delta)$$

where k is a proportionality constant greater than zero, representing an average power of the signal $D_I D_Q$.

Thus, the result is the same as in an optical DQPSK, i.e., this inventive concept is applicable to any I-Q quadrature modulation system.

Besides, although not illustrated in FIG. 2, a person of ordinary skill in this field would be aware that an amplifier and/or filter can be disposed between the tap 110 and the module squarer 114, between the module squarer 114 and the multiplier 116, between the multiplier 116 and the averager 118, between the averager 118 and the phase adjuster 120, or even between any two of the three inputs of the multiplier 116 as appropriate. Configuration of amplifier and/or filter is well known to a person of ordinary skill in this field, so it is not discussed in detail here.

Figure 3:
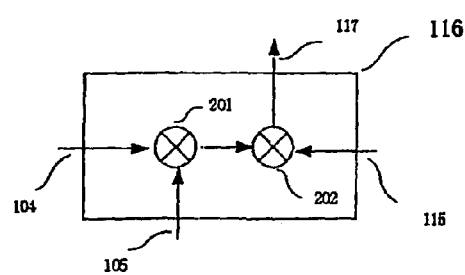
FIG. 3 to FIG. 16 are diagrams of various embodiments of a multiplier which may be included in the I-Q phase bias monitoring apparatus of FIG. 2. The multiplier is a part of a I-Q phase bias monitoring apparatus according to various embodiments of the present inventive concept.
Figure 4:
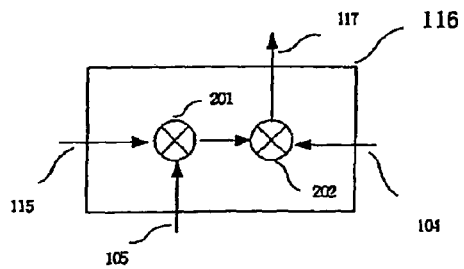
Figure 5:
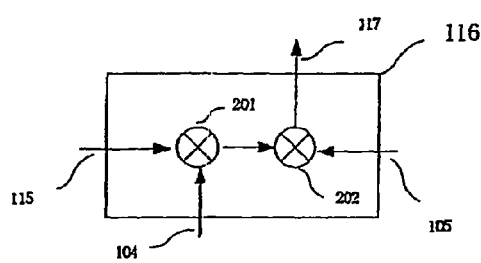

FIGS. 3 to 16 are diagrams of embodiments of multipliers. As illustrated in FIGS. 3, 4 and 5, a three-input multiplier 116 usable in various embodiments of this inventive concept may have two two-input multipliers 201 and 202 connected in series. The two-input multipliers may be one of the commercially available components (such as a mixer produced by Spectrum Microwave or DSP). In FIG. 3, the I-branch data 104 and the Q-branch data 105 are input to the first two-input multiplier 201, the output of which is input together with the output 115 of the module squarer 114 to the second two-input multiplier 202. The output 117 of the multiplier 116 is output of the second two-input multiplier 202.

FIG. 4 represents another three input multiplier 116 with two two-input multipliers 201 and 202 connected in series in which the Q-branch data 105 and the output 115 of module squarer 114 are input to the first two-input multiplier 201, while the I-branch data 104 and the output of the first two-input multiplier 201 are input to the second two-input multiplier 202.

FIG. 5 represents another three input multiplier 116 with two two-input multipliers 201 and 202 connected in series in which the I-branch data 104 and output 115 of module squarer 114 are input to the first two-input multiplier 201, while the Q-branch data 105 and the output of the first two-input multiplier 201 are input to the second two-input multiplier 202.

Figure 6:
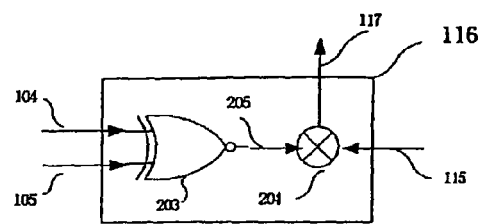

When the I-branch data and the Q-branch data are −1 and +1 or +1 and −1 respectively, another embodiment of the multiplier 116 represented in FIG. 6, can be used. The multiplier 116 of FIG. 6 consists of a NXOR gate 203 and a two-input multiplier 204. The I-branch data 104 and the Q-branch data 105 are input to the NXOR gate 203, and the output 205 of the NXOR gate 203 and the output 115 of the module squarer 114 are input to the multiplier 204. Logic table of the NXOR gate is as follows:

| | 104 | |
|---|---|---|
| 105 | Logic 0, −1 | Logic 1, 1 |
| Logic 0, −1 | Logic 1, 1 | Logic 0, −1 |
| Logic 1, 1 | Logic 0, −1 | Logic 1, 1 |

According to the expression of $D_I$, $D_Q$, logic 0 is equivalent to data −1, and logic 1 is equivalent to data 1. According to the above table, an output 205 of a NXOR gate is $D_I D_Q$. The output signal 117 of multiplier 116 is:

$$-2D_I D_Q \sin(\delta) D_I D_Q + 2D_I D_Q = -2\sin(\delta) + 2D_I D_Q$$

This is consistent with the I-Q bias monitoring apparatus of FIG. 2.

Figure 7:
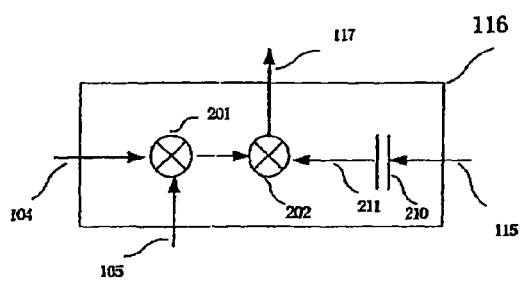

FIG. 7 represents an embodiment of the multiplier 116 that is similar to the multiplier represented in FIG. 3, but a capacitor 210 is connected in series to remove a DC component in the input signal 115. The output signal 211 of the capacitor 210 is:

$$-2D_I D_Q \sin(\delta)$$

The output signal 117 of the multiplier 116 as represented in FIG. 7 is:

$$-2D_I D_Q \sin(\delta) \times D_I D_Q = -2\sin(\delta).$$

The output signal 119 of the averager is $-2\sin(\delta)$.

Figure 8:
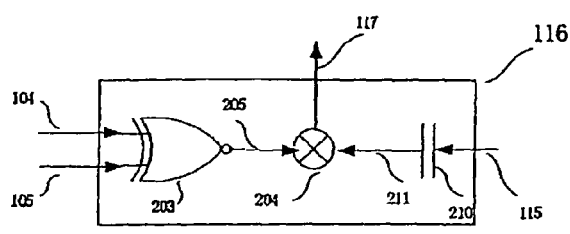

FIG. 8 represents another embodiment of the multiplier 116 that is similar to the multiplier represented in FIG. 6, except that a capacitor 210 is connected in series. The capacitor 210 functions similarly to the capacitor 210 of the multiplier of FIG. 7 described above.

Figure 9:
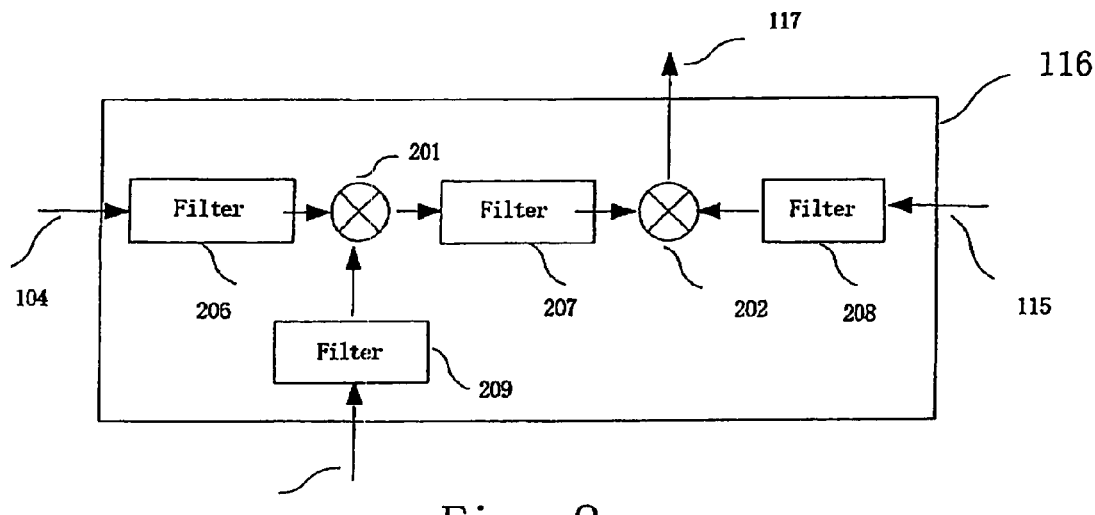

FIG. 9 represents another embodiment of the multiplier 116 that is similar to the multiplier represented in FIG. 3, but filters 206, 207, 208 and 209 are connected in series therein. The signals 104, 105 and 115 pass through filters before entering the two-input multipliers 201 and 202. Also a filter 207 is installed between the two two-input multipliers.

Figure 10:
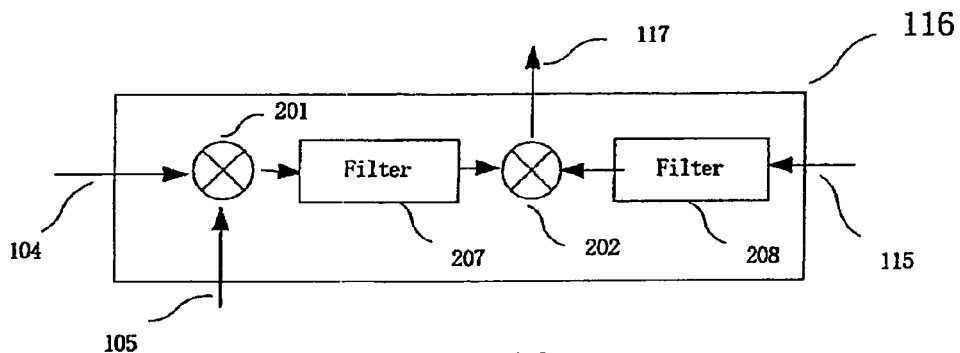

FIG. 10 represents another embodiment of the multiplier 116 that is similar to the multiplier represented in FIG. 3, but additionally the filters 207 and 208 are connected in series. The signal 115 passes through the filter 208 before entering the second two-input multiplier 202. The filter 207 is located between the two two-input multipliers 201 and 202.

Figure 11:
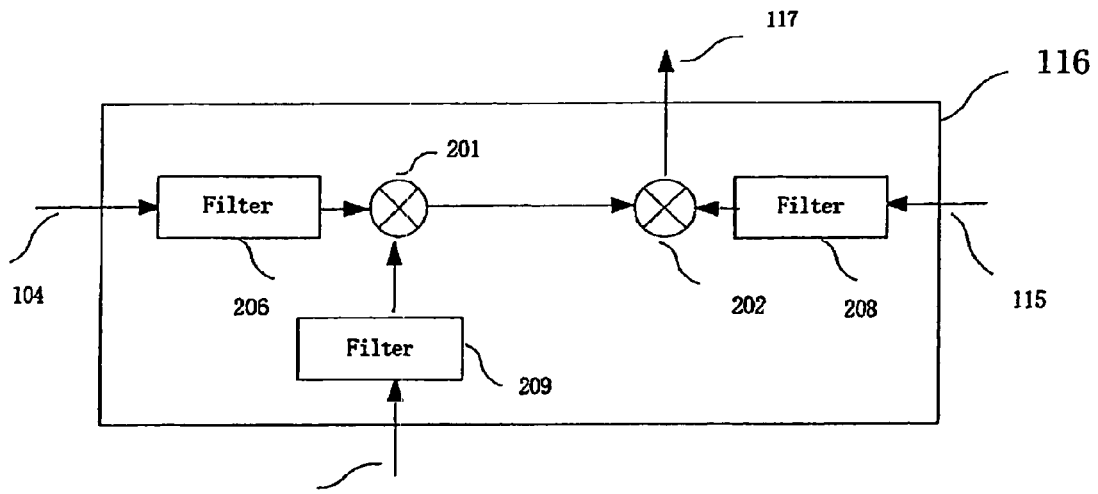

FIG. 11 is another embodiment of the multiplier 116 that is similar to the multiplier represented in FIG. 9, but the multiplier represented in FIG. 11 does not include the filter 207 which is located between the two two-input multipliers 201 and 202 in FIG. 9.

Figure 12:
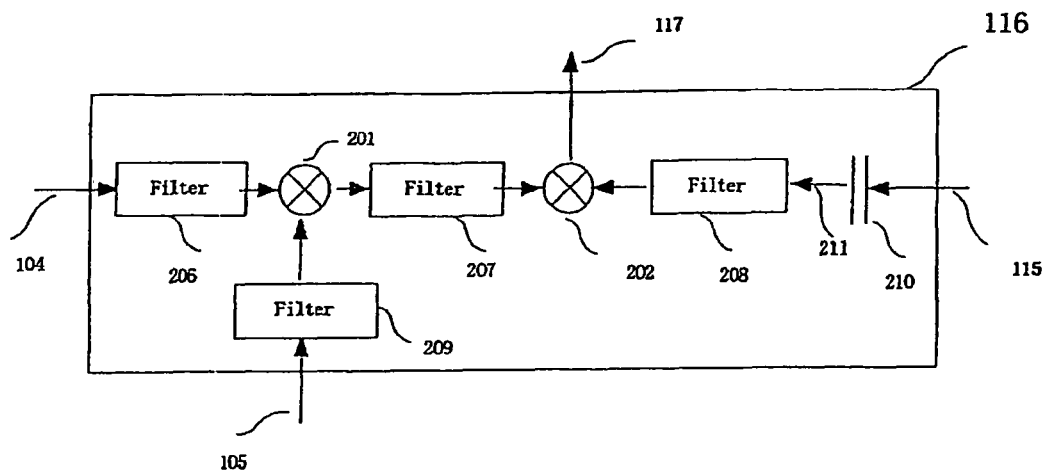
Figure 13:
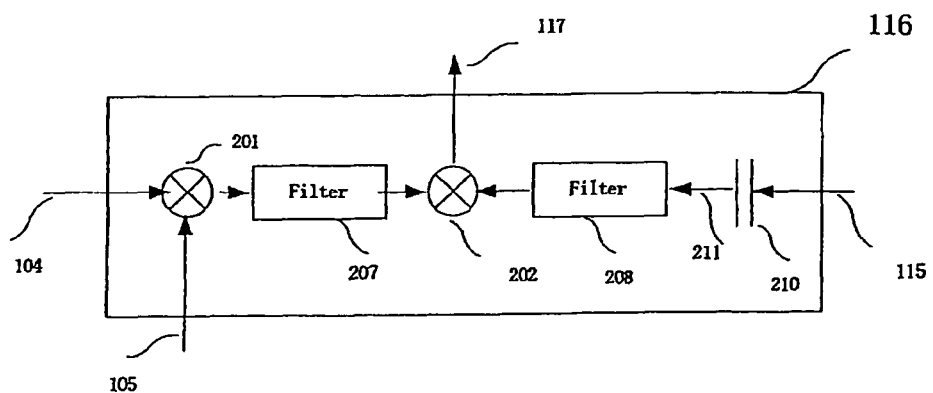
Figure 14:
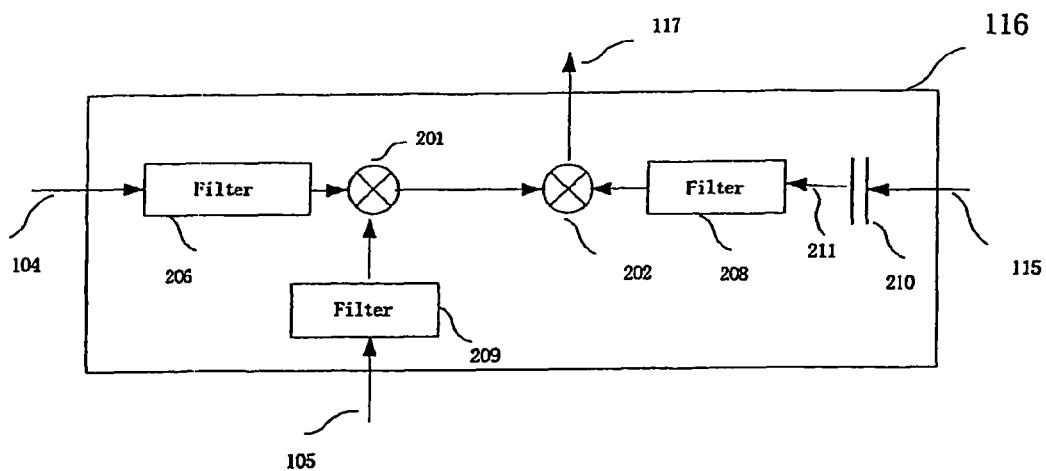

FIGS. 12-14 are embodiments of the multiplier 116 that are similar to the multipliers represented in FIGS. 9-11, respectively, but, additionally, a capacitor 210 is connected in series before the filter 208 respectively. The capacitor 210 functions similarly to the capacitor 210 of the multiplier of FIG. 7, previously described.

Figure 15:
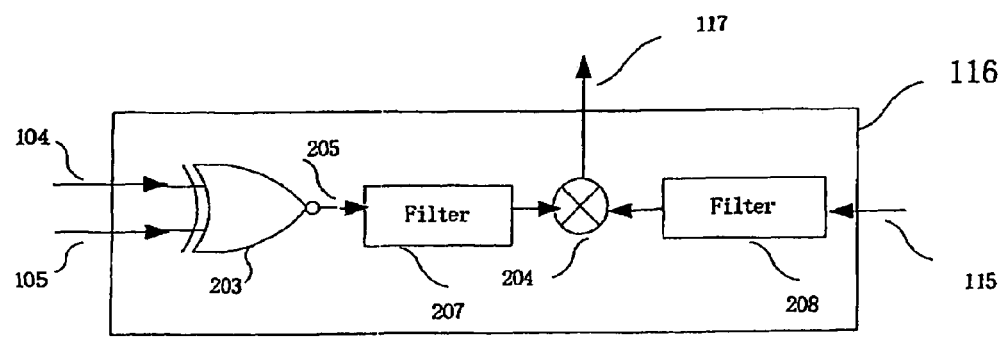

FIG. 15 is another embodiment of the multiplier 116 that is similar to the multiplier represented in FIG. 6, but additionally the filters 207 and 208 are connected in series.

Figure 16:
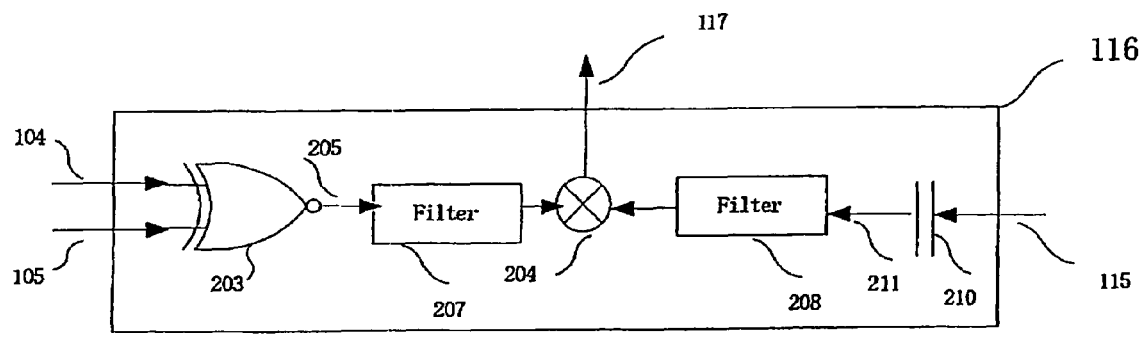

FIG. 16 is another embodiment of the multiplier 116 that is similar to the multiplier illustrated in FIG. 15, but, additionally, a capacitor 210 is connected in series.

Other configurations of the three-input multiplier 116 may be configured by a person of ordinary skill in the art according to principle of the present inventive concept. For example, a three-input multiplier 116 can be configured based on FIG. 4 and FIG. 5 with capacitors and/or filters added. That is, this invention should not be limited to the exact forms described above.

In addition, the tap 110 can also be placed after the pulse carver 111 in an alternative embodiment of the I-Q phase bias monitoring apparatus of FIG. 2.

In alternative embodiments of the I-Q phase bias monitoring apparatus, capacitors and/or amplifiers may be connected in series in any section of circuit before the multiplier 116.

The averager 118 (see FIG. 2) outputs a phase monitoring signal 119 which is provided to the phase adjust 120. When the phase monitoring signal 119 input to the phase adjust 120 is greater than zero, the phase bias should be increased; when the phase monitoring signal 119 is smaller than zero, the phase bias should be decreased; when the phase monitoring signal 119 equals zero, the phase bias should remain unchanged. Altering the phase bias can be done by changing the DC bias of the phase bias device 108, which may be a LiNbO3 DQPSK modulator produced by Sumitomo Osaka Cement.

Figure 17:
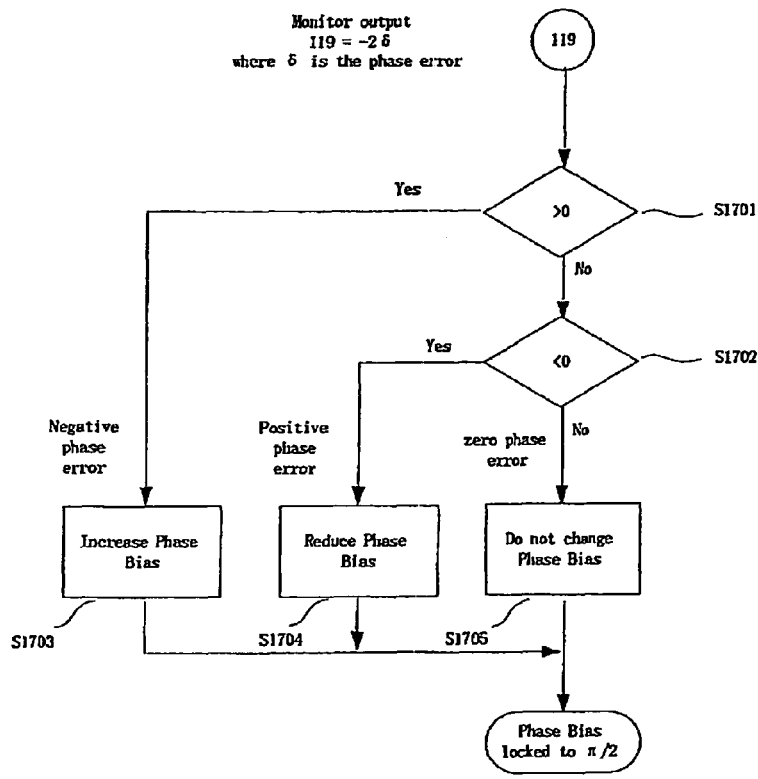
FIG. 17 to FIG. 19 are block diagrams of phase control methods according to various embodiments of the! present inventive concept.
Figure 18:
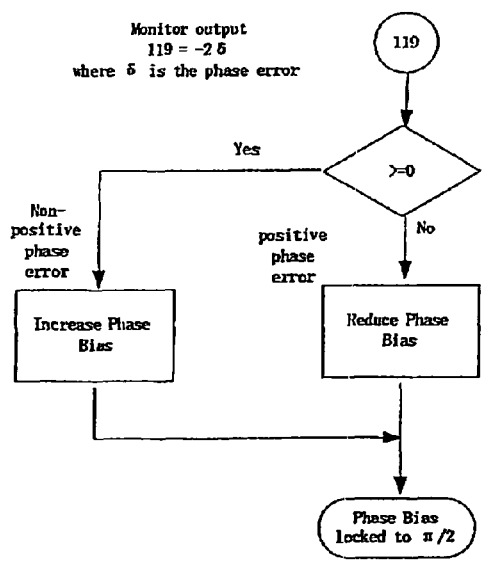
Figure 19:
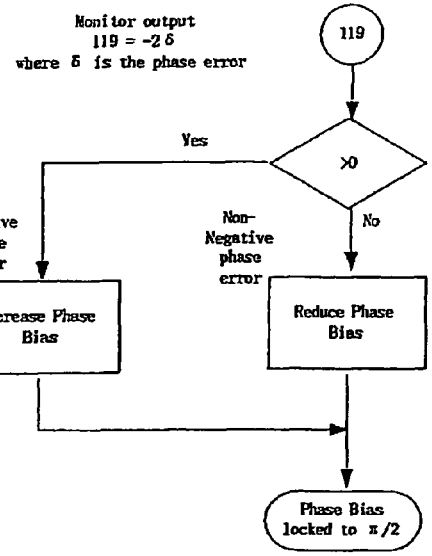

FIGS. 17-19 represent phase control methods according to embodiments of the present inventive concept.

As represented in FIG. 17, when a phase bias has a negative phase error, i.e. the phase bias is $\pi/2+\delta$ and $\delta<0$, the phase monitoring signal 119 is $-2\delta>0$ (S1701, yes). The phase adjust 120 increases a phase bias (S1703), so that the phase moves towards target value $\pi/2$. On the other hand, when the phase monitoring signal 119 is not greater than zero (S1701, no), then it is determined whether the phase monitoring signal 119 is smaller than zero (S1702). When the phase bias has a positive phase error, i.e. the phase bias is $\pi/2+\delta$ and $\delta>0$, the phase monitoring signal 119 is $-2\delta<0$ (S1742, yes). Then, the phase adjust 120 decreases the phase of the phase bias 108 (S1704), so that the phase bias moves towards target value $\pi/2$. When the phase error is zero (S1702, no), the phase monitoring signal 119 is zero, and the phase adjust 120 takes no corrective action (S1705) so that the phase remains at the target value.

FIG. 18 represents a method similar to the method illustrated in FIG. 17, but a condition for phase error zero is combined with a condition for a negative phase error, yielding a non-positive phase error condition. FIG. 19 illustrates a method similar to the method illustrated in FIG. 17, but a condition for a zero phase error is combined with a condition for a positive phase error, yielding a non-negative phase error condition. When phase monitoring signal 119 is zero, the phase adjustment is also zero, so the above specified combination of conditions does not obstruct the phase control. If a fixed step exists for the phase adjustment, then the phase bias will oscillate around the optimal (target) value with an amplitude equal to the step of the phase adjustment. If the step is small enough, such an oscillation is acceptable.

An invertor may exist between the averager 118 and the phase adjust 120. If such an invertor exists, a phase adjustment direction of the phase adjust 120 will be opposite to an output phase direction of the averager 118. Thus, a proper direction shall be defined as when a direction of the output phase of the averager 118 is positive (sometimes phase may be zero, if the context suggests so), the proper direction refers to a proper adjustment direction of the phase adjust 120; when a direction of the output phase of the averager 118 is negative (sometimes phase may be zero, if the context suggests so), the proper adjustment direction of the phase adjust 120 is another direction.

Figure 20:
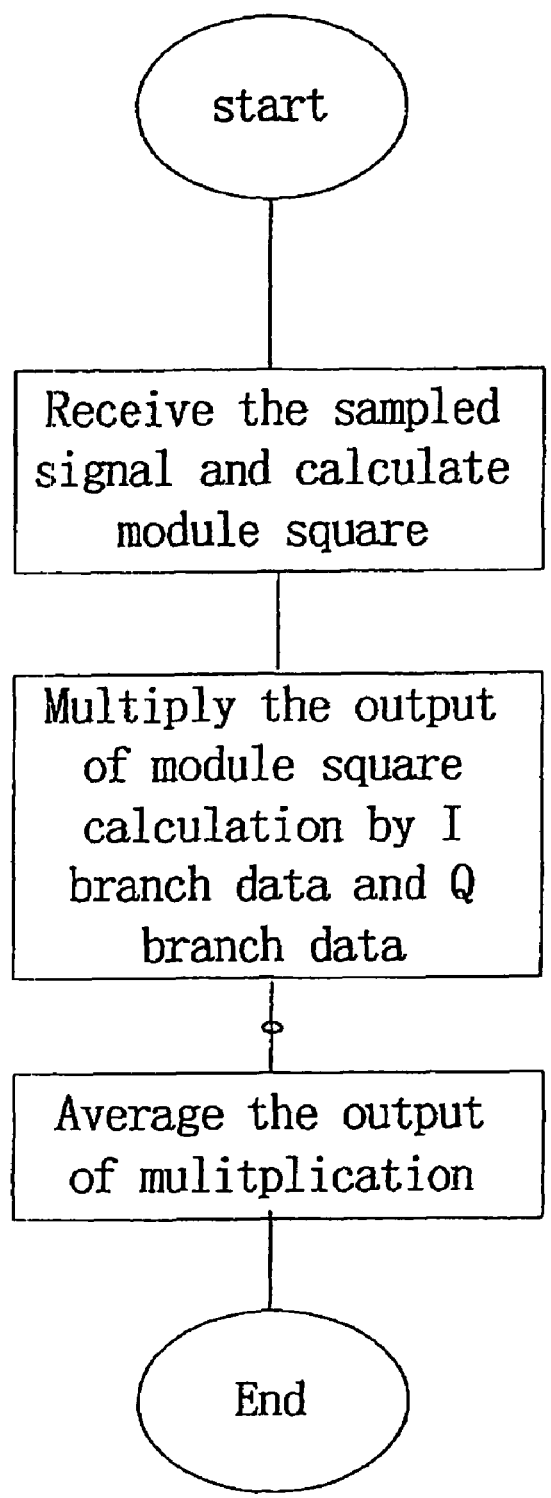
FIG. 20 is a diagram of data processing according to an I-Q phase bias monitoring method according to another embodiment of the present inventive concept.

Additionally, another embodiment of the present inventive concept provides an I-Q phase bias monitoring method which is used for (but not limited to) I-Q quadrature modulation system, such as a Differential Quadrature Phase-Shift Key (DQPSK), a Quadrature Phase-Shift Key (QPSK), a Multi Phase-Shift Key (M-PSK), a Differential Multi Phase-Shift Key (DM-PSK) and a Quadrature Amplitude Modulation (QAM) system. FIG. 20 represents the flow of a monitoring method according to an embodiment of the present inventive concept.

As illustrated in FIG. 20, an I-Q phase bias monitoring method consists of following procedures: a module square calculation procedure that receives a signal from a tap 110 and uses a module squarer 114 illustrated in FIG. 2 to calculate a module square of the signal; a multiplication procedure that multiplies data of the I-branch, data of the Q-branch and an output of said module square calculation procedure. The multiplication procedure may be executed by any of the various types of multipliers illustrated in FIGS. 3-16. That is, this multiplication procedure can be divided into a first multiplication operation and a second multiplication operation (illustrated in FIGS. 3-5, FIG. 7, and FIGS. 9-14). When the I-branch data and the Q-branch data are +1/−1 and −1/+1 respectively, this multiplication procedure can also be divided into an NXOR operation and an NXOR multiplication operation (as illustrated in FIG. 6, FIG. 8 and FIGS. 15-16). Furthermore, as illustrated, this multiplication procedure may also include filtering, direct current removal, amplification, etc. The I-Q phase bias monitoring method further includes an averaging procedure that averages the output of the multiplication procedure.

Furthermore, the I-Q phase bias monitoring method may also includes a phase adjusting procedure, which corrects a phase of the phase bias 108 as illustrated in FIGS. 17-19, the methods being described above.

An exemplary embodiment of the present inventive concept provides an I-Q quadrature modulation transmitter which consists of an I-branch, a Q-branch equipped with a phase bias, a tap and an I-Q phase bias monitor installed between the tap and the phase bias, to monitor a phase error of the phase bias. The I-Q phase bias monitor comprises at least the following components: a module squarer, receiving signal from the tap and outputting a module square of the signal; a multiplier, multiplying data of the I-branch, data of the Q-branch and an output of module squarer; and an averager, averaging the output of multiplier.

The multiplier may be any of the embodiments illustrated in FIGS. 3 to 16.

The I-Q quadrature modulation transmitter may be one of a Differential Quadrature Phase-Shift Key system, a Quadrature Phase-Shift Key system, a Multi Phase-Shift Key system, a Differential Multi Phase-Shift Key system or a Quadrature Amplitude Modulation system.

Furthermore, another embodiment of the present inventive concept may also comprise computer programs running on a computer or a single chip machine. For example, for an I-Q quadrature modulation transmitter consisting of an I-branch, a Q-branch equipped with a phase bias, and a tap, the computer programs can enable a CPU or a single chip machine to execute the following operations: calculating a module square of a signal received from the tap; multiplying data of the I-branch, data of the Q-branch and the calculated module square; and averaging the result of the multiplication operation.

The present inventive concept may be embodied in hardware, software or any combination there of. Therefore, the present inventive concept can be implemented in a number of different modes, all of which should be considered as within the scope of description herein. Any implementation mode can be referred to as "logic configured to execute an action" or "logic executing or capable of executing an action" alternatively.

Similarly, a computer and a single chip machine may also be used to perform such operations such as filtering, direct current removal and amplification.

Another embodiment of the present inventive concept is a computer-readable medium, in which programs mentioned above are stored. The computer-readable medium can be any device capable of holding, storing, delivering, spreading or transferring programs, to be used by instruction execution systems, equipments or facilities, or be integrated with such execution systems, equipments or facilities. The computer-readable medium includes but it is not limited to electronic, magnetic, optical, electromagnetic, infrared and semiconductor systems, devices and transfer media. Some more detailed examples includes (although the following list is not intended to be exhaustive) electric connection with one or more lead wires, portable computer disks, RAM, ROM, EPROM or FlashRom, optical fiber and portable CDROM, etc.

The above-described embodiments of the present inventive concept are for demonstration and explanation purpose only. They are not intended to exhaust or limit embodiments to the above exact forms. Many modifications and variations of the above-described embodiments are obvious to a person of ordinary skill in the art.

What is claimed is:

1. An apparatus monitoring a phase bias between branches of an I-Q quadrature modulation transmitter, said I-Q quadrature modulation transmitter having an I branch, a Q branch having a phase bias device, and a tap, said apparatus being mounted between said tap and said phase bias device, for determining a phase error of said phase bias device, the apparatus comprising:
a module squaring device receiving a signal from said tap and outputting a square module of said signal;
a multiplier outputting a multiplier signal resulting from multiplying data of said I branch, data of said Q branch and the square module output by said module squaring device; and
an averager averaging the multiplier signal output by said multiplier to determine the phase error.

2. The apparatus of claim 1, wherein said I-Q quadrature modulation transmitter further comprises a phase adjustor for adjusting a phase of said phase bias device according to an output of said apparatus.

3. The apparatus of claim 1, wherein said I-Q quadrature modulation transmitter is one of a differential quaternary phase shift keying system transmitter, a quaternary phase shift keying system transmitter, a multiple-phase shift keying system transmitter, a differential multiple-phase shift keying system transmitter and a quadrature modulation system transmitter.

4. The apparatus of claim 1, wherein said multiplier is a three-input multiplier comprising two two-input multipliers arranged in series.

5. The apparatus of claim 4, wherein a capacitor is placed in series between said module squaring device and said two-input multiplier.

6. The apparatus of claim 1, wherein
the data of said I branch and the data of said Q branch are respectively +1 and −1 or −1 and +1,
said multiplier is a three-input multiplier comprising an XOR gate and a two-input multiplier arranged in series,
the data of said I branch and the data of said Q branch are input into said XOR gate, and
an output of said XOR gate and the module square are input into said two-input multiplier.

7. The apparatus of claim 6, wherein a capacitor is placed in series between said module squaring device and said two-input multiplier.

8. A monitoring method of monitoring a phase bias between branches of an I-Q quadrature modulation transmitter, said I-Q quadrature modulation transmitter comprising an I branch, a Q branch having a phase bias device, and a tap, said monitoring method determining a phase error of said phase bias device, the monitoring method comprising:
calculating a module square of a signal received from said tap;

multiplying data of said I branch, data of said Q branch and the module square to output a multiplied signal; and averaging the output multiplied signal to determine the phase error.

9. The monitoring method of claim 8, wherein
said I branch data and said Q branch data are respectively +1 and −1 or −1 and +1, and
said multiplying comprises an XOR operation between said I branch data and said Q branch data, and multiplying a result of said XOR operation and the calculated module square.

10. The monitoring method of claim 8, further comprising removing a direct current from said calculated module square before multiplying.

11. The monitoring method of claim 10, wherein said I-Q quadrature modulation transmitter is any one of a differential quaternary phase shift keying system transmitter, a quaternary phase shift keying system transmitter, a multiple-phase shift keying system transmitter, a differential multiple-phase shift keying system transmitter and a quadrature modulation system transmitter.

12. The monitoring method of claim 8, wherein said I-Q quadrature modulation transmitter further comprises a phase adjustor for adjusting a phase of said phase bias device according to an output of said averaging.

13. The monitoring method of claim 12, wherein said phase adjustor performs an adjustment of the phase in a first direction when the output of said averaging is positive, performs an adjustment of the phase in a second direction opposite to the first direction when the output of said averaging is negative, and performs no adjustment when the output of said averaging is zero.

14. The monitoring method of claim 12, wherein said phase adjustor performs an adjustment of the phase in a first direction when the output of said averaging is positive, and performs an adjustment of the phase in a second direction when the output of said averaging is not positive.

15. The monitoring method of claim 12, wherein before said phase adjustor performs the adjustment of the phase the output of said averaging is inverted.

16. The monitoring method of claim 12, wherein said I-Q quadrature modulation transmitter is any one of from a differential quaternary phase shift keying system transmitter, a quaternary phase shift keying system transmitter, a multiple-phase shift keying system transmitter, a differential multiple-phase shift keying system transmitter and a quadrature modulation system transmitter.

17. The monitoring method of claim 8, wherein said I-Q quadrature modulation transmitter is any one of a differential quaternary phase shift keying system transmitter, a quaternary phase shift keying system transmitter, a multiple-phase shift keying system transmitter, a differential multiple-phase shift keying system transmitter and a quadrature modulation system transmitter.

18. A I-Q quadrature modulation transmitter, comprising:
an I branch;
a Q branch having a phase bias device;
a tap; and
a monitoring apparatus monitoring a phase bias between data corresponding to said I and said Q branches, mounted between said tap and said phase bias device for determining a phase error of said phase bias device, wherein said monitoring apparatus includes:
a module squaring device for receiving a signal from said tap and outputting a square module of said signal;
a multiplier for multiplying data of said I branch, data of said Q branch and said module square to output a multiplied signal; and
an averager for averaging the multiplied signal output by said multiplier.

19. The I-Q quadrature modulation transmitter of claim 18, further comprising a phase adjustor for adjusting the phase of said phase bias device according to an output of said monitoring apparatus.

20. The I-Q quadrature modulation transmitter of claim 18, that is any one of a differential quaternary phase shift keying system transmitter, a quaternary phase shift keying system transmitter, a multiple-phase shift keying system transmitter, a differential multiple-phase shift keying system transmitter and a quadrature modulation system transmitter.

21. The I-Q quadrature modulation transmitter of claim 18, wherein said multiplier is a three-input multiplier comprising two two-input multipliers arranged in series.

22. The I-Q quadrature modulation transmitter of claim 21, further comprising a capacitor placed in series between said module squaring device and said two-input multiplier.

23. The I-Q quadrature modulation transmitter of claim 18, wherein
the data of said I branch and the data of said Q branch are respectively +1 and −1 or −1 and +1,
said multiplier is a three-input multiplier comprising an XOR gate and a two-input multiplier arranged in series,
the data of said I branch and the data of said Q branch are input into said XOR gate, and
an output of said XOR gate and the square module output by said module squaring device are input into said two-input multiplier.

24. The I-Q quadrature modulation transmitter of claim 23, further comprising a capacitor placed in series between said module squaring device and said two-input multiplier.

25. A method of controlling a phase difference between a first signal and a second signal, comprising:
generating a multiplication result signal by multiplying the first signal, the second signal and a signal proportional to a module square of a sum of the first and second signals; and
adjusting the phase difference between the first signal and the second signal to a phase difference target value based on a phase deviation extracted from an average of the multiplication result signal.

* * * * *